(12) United States Patent
Rausch

(10) Patent No.: US 7,873,969 B2
(45) Date of Patent: Jan. 18, 2011

(54) TRANSDUCER ASSEMBLY FOR THERMALLY ASSISTED WRITING AND READ BACK IN DATA STORAGE DEVICES

(75) Inventor: Tim Rausch, Gibsonia, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 1436 days.

(21) Appl. No.: 10/881,609

(22) Filed: Jun. 30, 2004

(65) Prior Publication Data

US 2006/0005216 A1 Jan. 5, 2006

(51) Int. Cl.
*G11B 11/00* (2006.01)

(52) U.S. Cl. ...................................................... 720/659

(58) Field of Classification Search ........................ None
See application file for complete search history.

(56) References Cited

U.S. PATENT DOCUMENTS

| | | | | |
|---|---|---|---|---|
| 5,199,090 A * | 3/1993 | Bell | ............................. | 385/33 |
| 5,630,004 A * | 5/1997 | Deacon et al. | .............. | 385/129 |
| 5,707,727 A | 1/1998 | Takahashi et al. | | |
| 5,781,670 A * | 7/1998 | Deacon et al. | ................ | 385/10 |
| 5,835,458 A * | 11/1998 | Bischel et al. | ........... | 369/44.12 |
| 6,141,465 A * | 10/2000 | Bischel et al. | ................. | 385/4 |
| 6,393,172 B1 * | 5/2002 | Brinkman et al. | ............. | 385/16 |
| 6,522,794 B1 * | 2/2003 | Bischel et al. | ................. | 385/4 |
| 6,545,970 B2 | 4/2003 | Durnin et al. | | |
| 6,603,619 B1 | 8/2003 | Kojima et al. | | |
| 2003/0128633 A1 | 7/2003 | Batra et al. | | |
| 2003/0128634 A1 | 7/2003 | Challener | | |
| 2003/0137772 A1 | 7/2003 | Challener | | |
| 2003/0227831 A1 | 12/2003 | Herget | | |
| 2004/0001394 A1 | 1/2004 | Challener et al. | | |
| 2004/0001420 A1 | 1/2004 | Challener | | |
| 2004/0008591 A1 | 1/2004 | Johns et al. | | |
| 2005/0078565 A1 * | 4/2005 | Peng et al. | ............... | 369/13.32 |
| 2005/0122850 A1 * | 6/2005 | Challener et al. | ......... | 369/13.24 |
| 2005/0289576 A1 * | 12/2005 | Challener | ................... | 720/658 |

* cited by examiner

*Primary Examiner*—Mark Blouin
(74) *Attorney, Agent, or Firm*—Robert P. Lenart, Esq.; Pietragallo Gordon Alfano Bosick & Raspanti, LLP

(57) ABSTRACT

A transducer assembly for a data storage system comprises a first transducer for directing electromagnetic radiation onto a storage medium adjacent to a write pole, and a second transducer for directing electromagnetic radiation onto a storage medium adjacent to a read sensor. A data storage apparatus that includes the transducer assembly is also included.

20 Claims, 4 Drawing Sheets

TRANSDUCER ASSEMBLY FOR THERMALLY ASSISTED WRITING AND READ BACK IN DATA STORAGE DEVICES

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

This invention relates to transducers for concentrating electromagnetic radiation, and more particularly, to such transducers for use in data storage applications.

BACKGROUND OF THE INVENTION

Heat assisted magnetic recording (HAMR) generally refers to the concept of locally heating a recording medium to reduce the coercivity of the recording medium so that the applied magnetic writing field can more easily direct the magnetization of the recording medium during the temporary magnetic softening of the recording medium caused by the heat source. Heat assisted magnetic recording allows for the use of small grain media, which is desirable for recording at increased areal densities, with a larger magnetic anisotropy at room temperature to assure sufficient thermal stability. By heating the medium, the material's magnetic crystalline anisotropy energy density or the coercivity is reduced such that the magnetic write field is sufficient to write to the medium. Once the medium cools to ambient temperature, the medium has a sufficiently high value of coercivity to assure thermal stability of the recorded information.

It is well-known in magneto-optical (MO) recording that there are media that require heating in order for the information to be retrieved from a disc. For example, MO recording media comprised of TbFeCO is extremely thermally stable due to the divergence of the coercivity of the media at room temperature. However, at room temperature the magnetization is zero making it impossible for read back using a magnetoresistive sensor. In order to read this type of medium with a magnetoresistive (MR) sensor, the medium first needs to be heated to induce a magnetization in the film. Other media that can use thermally assisted read back include magnetic super resolution media, MAMMOS (Magnetic Amplifying MO System) media, and various exchange spring type media.

Transducers have been proposed for use in heat assisted magnetic recording (HAMR) wherein the light delivery system is aligned only with the writer and not the reader. Furthermore, given the complexity of the alignment problem, it does not seem likely that it will be possible to design a transducer where the reader and writer can be simultaneously aligned with the light delivery element.

There is a need for a transducer assembly that can be used in storage devices using thermally assisted writing and read back.

SUMMARY OF THE INVENTION

This invention provides a transducer assembly for a data storage system comprising a first transducer for directing electromagnetic radiation onto a storage medium adjacent to a write pole, and a second transducer for directing electromagnetic radiation onto a storage medium adjacent to a read sensor.

In another aspect, the invention provides a data storage apparatus comprising a storage medium; and an arm for positioning a recording head adjacent to the storage medium; wherein the recording head includes a transducer assembly comprising a first transducer for directing electromagnetic radiation onto a storage medium adjacent to a write pole, and a second transducer for directing electromagnetic radiation onto a storage medium adjacent to a read sensor.

DETAILED DESCRIPTION OF THE INVENTION

Figure 1:
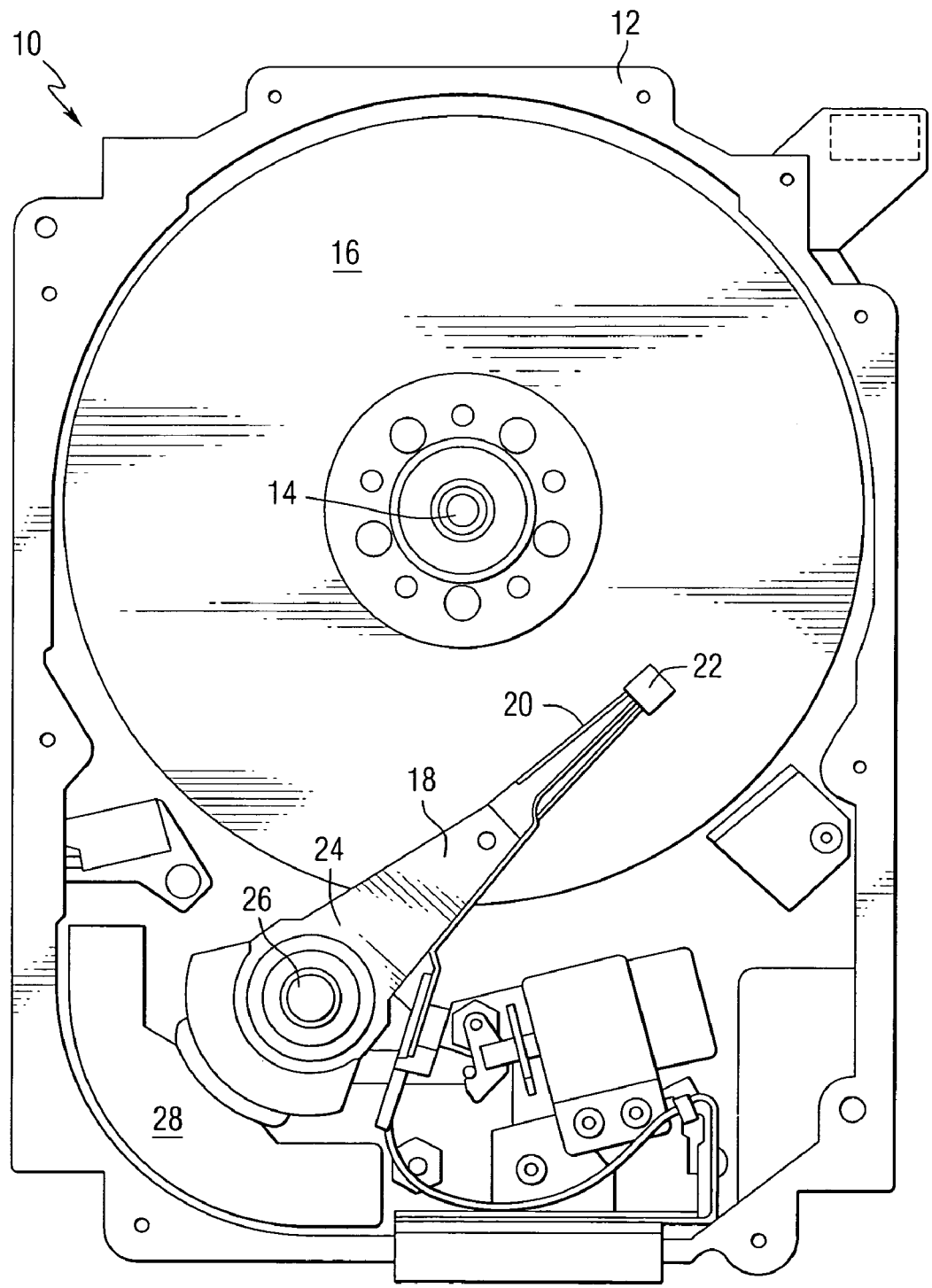
FIG. 1 is a pictorial representation of a disc drive that can include the transducer assemblies of this invention.

This invention encompasses structures that can be used in recording heads for use with magnetic and/or optical recording media, as well as magnetic and/or optical recording heads that include such devices and disc drives that include the recording heads. FIG. 1 is a pictorial representation of a disc drive 10 that can utilize transducer assemblies constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art.

For heat assisted magnetic recording, an electromagnetic wave of, for example, visible, infrared, or ultraviolet light is directed onto a surface of a data storage medium to raise the temperature of a localized area of the medium to facilitate switching of the magnetization of the area. Solid immersion lenses (SILs) and solid immersion mirrors (SIMs) have been proposed for use in reducing the size of a spot on the medium that is subjected to the electromagnetic radiation. SILs and SIMs may be either three-dimensional or two-dimensional. In the latter case they correspond to mode index lenses or mirrors in planar waveguides. The SILs and SIMs form a condenser that directs an electromagnetic wave to a focal point. A metallic pin can be inserted at the focal point to guide a confined beam of light out of the condenser to the surface of the recording medium. The metallic pin is just an example of one type of near field transducer. The role of the near field transducer is to reduce the spot size within the condenser to even smaller spot sizes typically less than 100 nm. Other near field transducers are the ridge waveguide, apertures and optical antennas such as the bowtie antenna.

Some magneto-optical (MO) recording media must be heated to retrieve information from the disc. To read this type of media with a magnetoresistive (MR) sensor, the media must be heated to induce a magnetization in the film.

This invention provides a transducer assembly for heating the media to accommodate both writing and reading. The transducer assembly includes two transducers that can be mounted on a slider. The invention will work with all media requiring thermally assisted read back such as magnetic super resolution media, MAMMOS media and various exchange spring type media.

In one example, the invention includes separate transducers for the writer and the reader. Each of the transducers includes a condenser, in the form of a waveguide, and a near field transducer. The waveguides can be, for example, SILs or SIMs and the near field transducers can be, for example, metallic pins. Each waveguide and near field transducer design can be separately optimized for writing or read back. The details of the waveguide and transducer alignment are dependent on the orientation of the medium and the chosen field delivery source and reader technology.

For the writer it is desirable to maximize the power in the waveguide to heat the media and confine it to the smallest spot possible. For the reader it is desirable to have stable power to avoid introducing any nonlinearities. In addition, the reader would operate at lower power than the writer. Typically, today's hard drive write wide and read narrow. That is, the reader spot size might be smaller than the writer spot size to avoid reading information from neighboring tracks.

Figure 2:
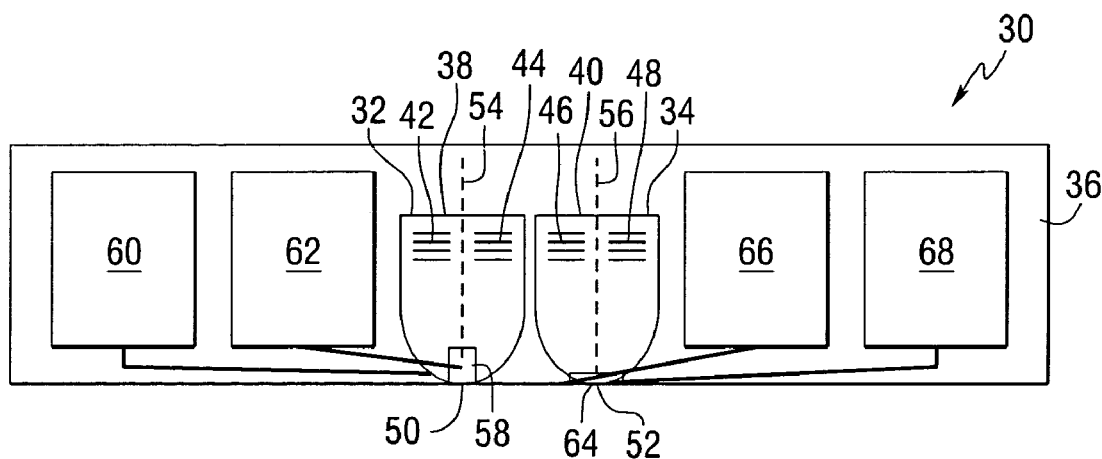
FIG. 2 is a schematic representation of an end view of a slider including a transducer assembly constructed in accordance with the invention.

FIG. 2 shows an example slider 30 that includes two optical transducers 32, 34 fabricated side by side on a back surface 36 of the slider. The optical transducers in this example include condensers in the form of solid immersion mirrors (SIMs) 38 and 40, with gratings 42, 44, 46 and 48 for coupling electromagnetic radiation, such as infrared, visible or ultraviolet light into the SIMs. The gratings in each of the SIMs can be offset so that polarized light in one half of each SIM is phase shifted with respect to the light in the other half of the SIM. The light is directed to transducer focal points 50, 52 such that the electric field component of the light at the focal point is parallel to the axes 54, 56 of the SIMs. A metallic pin can be positioned at each focal point to concentrate the light and direct it toward the storage media. SIM 38 is positioned adjacent to a write pole 58. Tabs 60 and 62 serve as connection points for connecting write signals to the writer. SIM 40 is positioned adjacent to a read element 64, such as magnetoresistance element or a giant magnetoresistance element. Tabs 66 and 68 serve as connection points for connecting read signals from the read element.

An optical fiber can be used to direct light onto the gratings. In this example, either the slider or the fiber can be moved so that the light is shifted from one pair of gratings to the other, depending on whether or not one is reading or writing. For example, the fiber can be fixed and the slider would be moved under the fiber. This can be accomplished using a dual stage actuator that can be modified to not only have a small actuation for tracking, but to also have a large throw for moving the slider under the fiber. Using current SIM designs the slider would have to be shifted a distance of about 100 μm. Although this distance is relatively large, it does not need to be accurate, and being off by a micron or so is not important. The advantage of this design is that both SIMs can be fabricated in the same lithography step since both SIMs are contained in a single waveguide layer in the read/write head. Instead of using a fiber, free space coupling could be used. In a free space coupling example, a laser can be mounted on the E-Block (24 in FIG. 1) and its light can be directed to the back of the slider. The spot can be moved from one SIM to the other by either moving the slider or by moving the laser.

With the example of FIG. 2, there is a read/write offset that can be on the order of tens of microns. This may have tracking implications as the reader will be reading a servo signal that could be 500 tracks away from the track being written.

Figure 3:
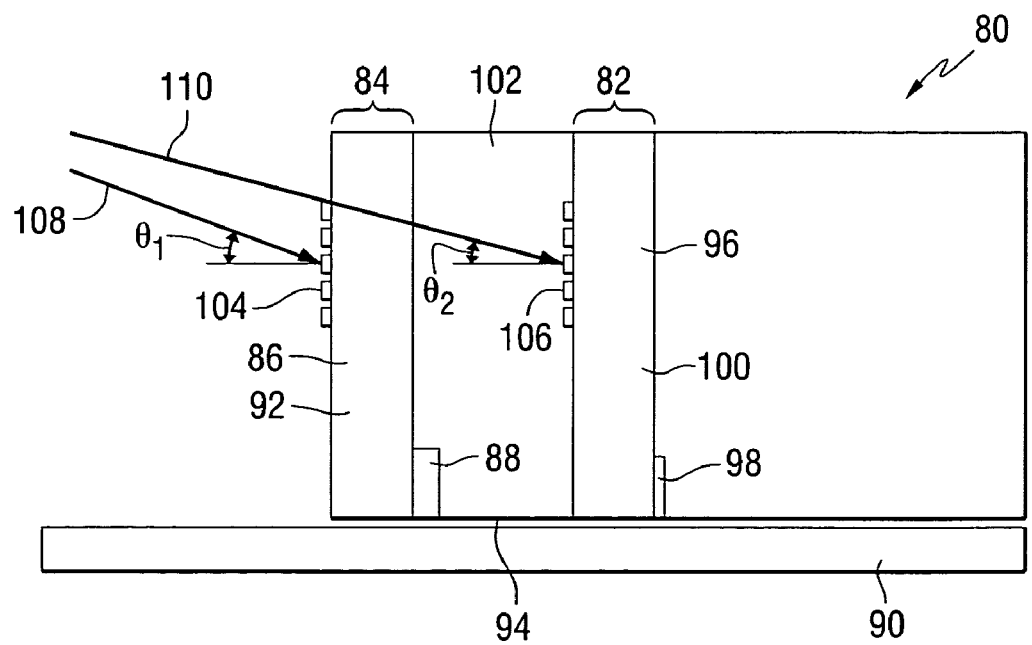
FIG. 3 is a schematic representation of a side view of another slider including a transducer assembly constructed in accordance with the invention.

FIG. 3 is a schematic representation of another slider 80 having a transducer assembly constructed in accordance with the invention. In slider 80, the reader 82 and writer 84 are fabricated on top of each other. A first transducer 86 is positioned adjacent to a write pole 88 to locally heat a portion of a storage medium 90 in an area subject to a magnetic field produced at the write pole. The first transducer includes a SIM waveguide 92 and can further include a near field transducer element positioned adjacent to an air bearing surface 94 of the slider. A second transducer 96 is positioned adjacent to a read element 98 to locally heat a portion of the storage medium 90 in an area near the read element. The second transducer includes a SIM waveguide 100 and can further include a near field transducer element positioned adjacent to the air bearing surface 94 of the slider.

In the example of FIG. 3, two waveguides 92, 100 are again used (one for the reader and one for the writer) and separately optimized for each transducer. The waveguides are separated by a thick cladding layer 102, which can be for example a few microns thick, to ensure that there is no cross talk between the waveguides. The waveguides can be constructed of, for example, $TiO_2$, or other high index guide layer. The cladding layer can be constructed of, for example, $SiO_2$ or other low index cladding layer. All layers are transparent to the light.

Gratings 104 and 106, each of which can be a pair of offset gratings as shown in FIG. 2, are provided to couple light into the waveguides. Light, represented by arrows 108 and 110, can be selectively launched into the waveguides by changing the coupling angle from angle "$\theta_1$" for the writer to angle "$\theta_2$" for the reader. Measurements have shown that a change in angle as small as only 2 degrees is sufficient to switch between the waveguides. In this example the angle could be changed by tilting the angle of an optical fiber that transmits the light from a light source, such as a laser, to the slider. Alternatively, it is also possible to change the light angle electro-optically and/or mechanically with a mirror. Devices which can be used to change the light angle do not need to be fabricated on the slider but could instead be attached to the fiber directly.

Figure 4:
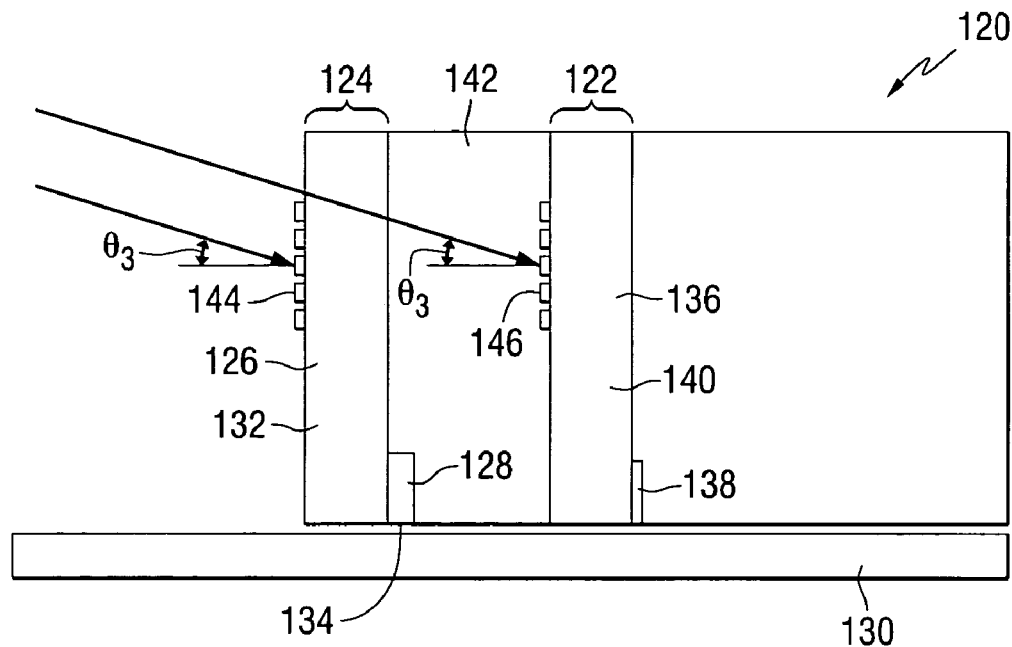
FIG. 4 is a schematic representation of a side view of another slider including a transducer assembly constructed in accordance with the invention.

If changing the angle of the incident light is not practical, it is possible to selectively couple the light into the waveguides by altering the polarization state of the incident light. FIG. 4 is a schematic representation of another slider 120 having a transducer assembly constructed in accordance with the invention. In slider 120, the reader 122 and writer 124 are fabricated on top of each other. A first transducer 126 is positioned adjacent to a write pole 128 to locally heat a portion of a storage medium 130 in an area subject to a magnetic field produced at the write pole. The first transducer includes a SIM waveguide 132 and can further include a near field transducer element positioned adjacent to an air bearing surface 134 of the slider. A second transducer 136 is positioned adjacent to a read element 138 to locally heat a portion of the storage medium 130 in an area near the read element. The second transducer includes a SIM waveguide 140 and can further include a near field transducer element positioned adjacent to the air bearing surface 134 of the slider.

In slider 120, the reader 122 and writer 124 are fabricated on top of each other. Here two waveguides 132, 140 are again used (one for the reader and one for the writer) and separately optimized for each transducer. The waveguides are separated by a thick cladding layer 142, which can be for example a few microns thick, to ensure that there is no cross talk between the waveguides. Gratings 144 and 146 are used to couple the light into the waveguides.

For this embodiment the angle $\theta_3$ remains fixed and the polarization of the light which is coupled into the fiber is rotated by 90 degrees. In this example, the light is linearly polarized. However, the invention is not limited to use with linearly polarized light. The incident light can have two distinct polarization states that address each of the gratings separately. The grating on each of the waveguides is adjusted to couple either transverse electric (TE) or transverse magnetic (TM) modes into the waveguides. This can be accomplished by changing the grating period.

Experiments have shown these gratings to be highly dependent on the polarization and almost no coupling occurs if the polarization is incorrect. This design also allows for simultaneous read back and writing, since any polarization angle can be set and the power can be shifted back and forth between the gratings. For example, if both gratings were designed to couple light equally well, a polarization angle of 45 degrees would split the light 50/50 between both gratings.

There are many options for controlling the amount of light coupled into the waveguides. The light power can be adjusted at the source by changing the drive current or by modifying the grating designs. For example, the amount of light coupled into the waveguide is dependent on the grating period, grating depth, material choices, coupling angle and polarization.

Figure 5:
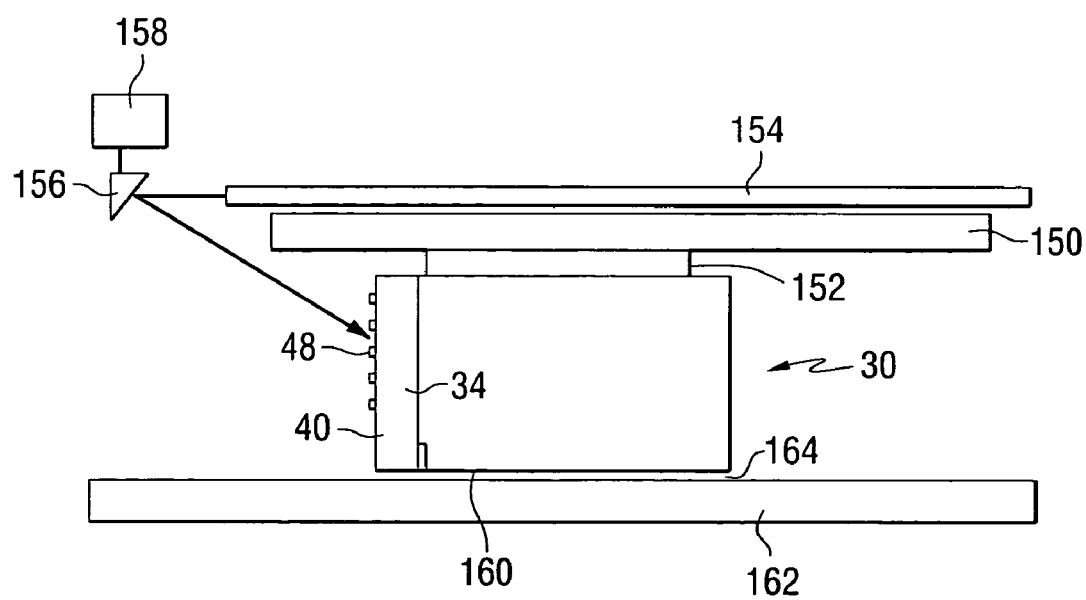
FIGS. 5, 6 and 7 are schematic representations of portions of recording head assemblies including transducer assemblies constructed in accordance with the invention.

FIG. 5 is a schematic representation of a portion of a recording head assembly including a transducer assembly constructed in accordance with the invention. In the example of FIG. 5, the slider 30 of FIG. 2 is shown to be coupled to an arm 150 by a microactuator 152. An optical fiber 154 is used to transmit light to a mirror 156. The light is reflected from the mirror to a grating 48 of the waveguide 40 of transducer 34. The microactuator 152 can be used to move the slider in a direction perpendicular to the drawing sheet, so that the incident light is shifted from one waveguide to the other. Alternatively, a microactuator 158 can be coupled to the mirror to move the mirror and shift the incident light from one waveguide to the other. The arm 150 positions the slider such that the air bearing surface 160 of the slider is separated from the storage medium 162 by an air bearing 164. The mirror (and the microactuator connected to the mirror, if used) would be supported by other structures not shown.

Figure 6:
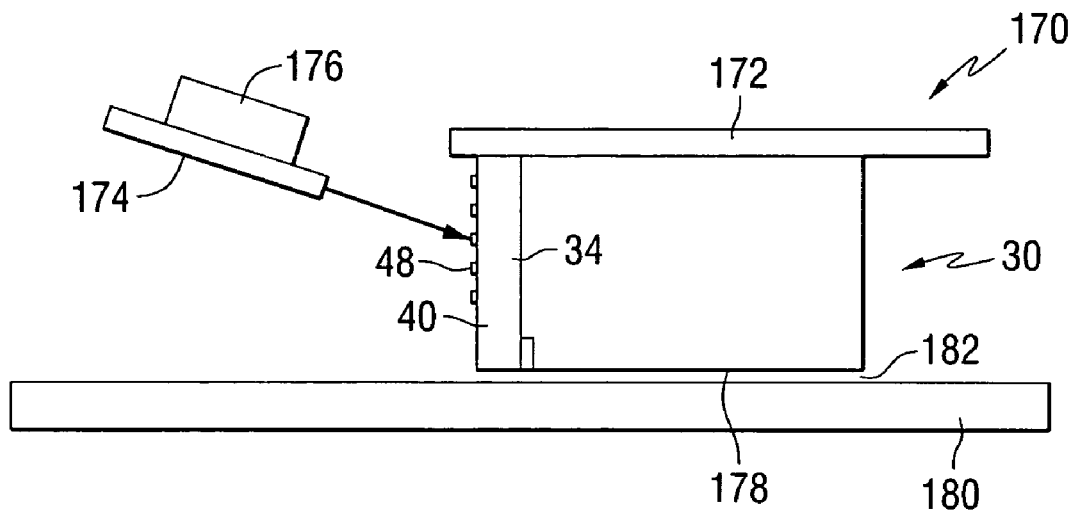

FIG. 6 is a schematic representation of a portion of another recording head assembly 170 including a transducer assembly constructed in accordance with the invention. In the example of FIG. 6, the slider 30 of FIG. 2 is shown to be supported by an arm 172. An optical fiber 174 is used to transmit light to a grating 48 of the waveguide 40 of transducer 34. A microactuator 176 can be used to move the optical fiber in a direction perpendicular to the drawing sheet, so that the incident light is shifted from one waveguide to the other. The arm 172 positions the slider such that the air bearing surface 178 of the slider is separated from the storage medium 180 by an air bearing 182. The optical fiber (and the microactuator connected to the optical fiber) would be supported by other structures not shown.

Figure 7:
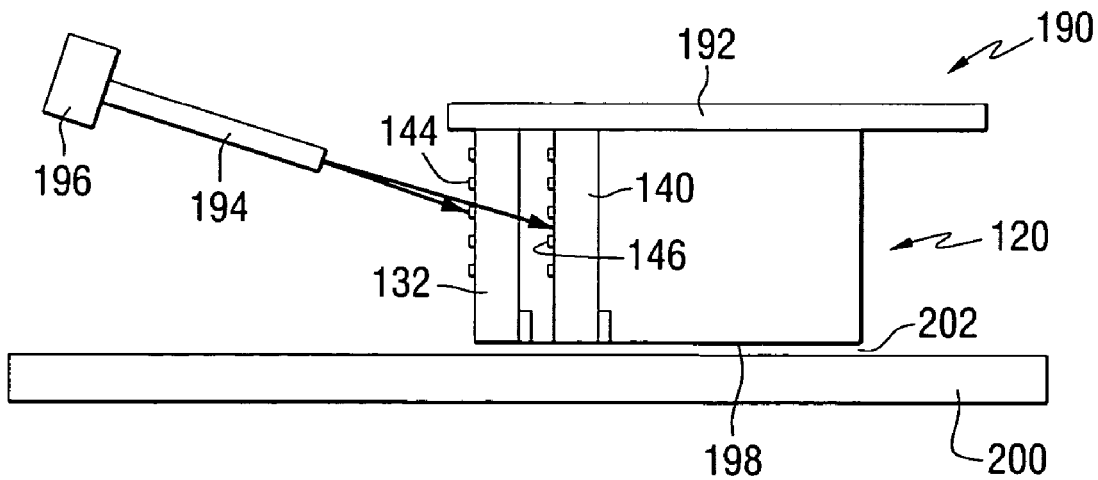

FIG. 7 is a schematic representation of a portion of another recording head assembly 190 including a transducer assembly constructed in accordance with the invention. In the example of FIG. 7, the slider 120 of FIG. 4 is shown to be supported by an arm 192. An optical fiber 194 is used to transmit light to the gratings 144 and 146 of the waveguides 132 and 140 of transducers. A polarization control device 196 is mounted to control the polarization of the light delivered by the optical fiber, so that the incident light coupled into one waveguide or the other, or both. The arm 192 positions the slider such that the air bearing surface 198 of the slider is separated from the storage medium 200 by an air bearing 202. The optical fiber (and the polarization control device) would be supported by other structures not shown. Electro-optic or magneto-optic materials can be used to rotate the polarization. With these materials an electric field or magnetic field can be applied to the material and adjusted to rotate the polarization of the light. Alternatively, wave plates or a polarizer can be used. These devices must be mechanically rotated in the path of the beam to change the polarization.

This invention provides a transducer assembly that can be used with media requiring thermally assisted read back such as magnetic super resolution media, MAMMOS media and various exchange spring type media.

While the invention has been described in terms of several examples, it will be apparent to those skilled in the art that various changes can be made to the disclosed examples without departing from the invention as set forth on the following claims.

What is claimed is:

1. A transducer assembly comprising:
a first transducer, having an end adjacent to an air bearing surface and to a write pole, to direct electromagnetic radiation to a first spot on a storage medium adjacent to the write pole; and
a second transducer, having an end adjacent to the air bearing surface and to a read sensor, to direct electromagnetic radiation to a second spot on a storage medium adjacent to the read sensor.

2. The transducer assembly of claim 1, wherein:
the first transducer includes a first planar waveguide for directing the electromagnetic radiation to a first focal point; and
the second transducer includes a second planar waveguide for directing the electromagnetic radiation to a second focal point, wherein the first and second planar waveguides are formed in a common layer.

3. The transducer assembly of claim 1, wherein:
the first transducer includes a first planar waveguide for directing the electromagnetic radiation to a first focal point; and
the second transducer includes a second planar waveguide for directing the electromagnetic radiation to a second focal point, wherein the first and second planar waveguides are formed in different layers separated by a cladding layer.

4. The transducer assembly of claim 1, further comprising a coupling structure for coupling either transverse electric mode electromagnetic radiation or transverse magnetic mode electromagnetic radiation into the first transducer.

5. The transducer assembly of claim 1, further comprising:
a device for alternatively directing the electromagnetic radiation to the first and second transducers.

6. The transducer assembly of claim 5, wherein the transducer assembly is mounted on a slider, and the device for alternatively directing the electromagnetic radiation to the first and second transducers comprises an actuator for moving the slider.

7. The transducer assembly of claim 5, wherein the device for alternatively directing the electromagnetic radiation to the first and second transducers comprises:

a minor for reflecting the electromagnetic radiation onto the first and second transducers; and an actuator for moving the minor.

8. The transducer assembly of claim 5, wherein the device for alternatively directing the electromagnetic radiation to the first and second transducers comprises:

an optical fiber for directing the electromagnetic radiation onto the first and second transducers; and an actuator for moving the optical fiber.

9. The transducer assembly of claim 5, wherein the device for alternatively directing the electromagnetic radiation to the first and second transducers comprises:

a polarization control device.

10. The transducer assembly of claim 1, wherein each of the first and second transducers includes a near field transducer comprising one of: a metallic pin, a bow tie optical antenna, an aperture, or a ridge waveguide.

11. A data storage apparatus comprising:

a storage medium;

an arm to position a recording head adjacent to the storage medium; and wherein the recording head includes a transducer assembly comprising a first transducer, having an end adjacent to an air bearing surface and to a write pole, to direct electromagnetic radiation to a first spot on a storage medium adjacent to the write pole, and a second transducer, having an end adjacent to the air bearing surface and to a read sensor, to direct electromagnetic radiation to a second spot on a storage medium adjacent to the read sensor.

12. The data storage apparatus of claim 11, wherein:

the first transducer includes a first planar waveguide for directing the electromagnetic radiation to a first focal point; and the second transducer includes a second planar waveguide for directing the electromagnetic radiation to a second focal point, wherein the first and second planar waveguides are formed in a common layer.

13. The data storage apparatus of claim 11, wherein:

the first transducer includes a first planar waveguide for directing the electromagnetic radiation to a first focal point; and the second transducer includes a second planar waveguide for directing the electromagnetic radiation to a second focal point, wherein the first and second planar waveguides are formed in different layers separated by a cladding layer.

14. The data storage apparatus of claim 11, further comprising a coupling structure for coupling either transverse electric mode electromagnetic radiation or transverse magnetic mode electromagnetic radiation into the first transducer.

15. The data storage apparatus of claim 11, further comprising:

a device for alternatively directing the electromagnetic radiation to the first and second transducers.

16. The data storage apparatus of claim 15, wherein the transducer assembly is mounted on a slider, and the device for alternatively directing the electromagnetic radiation to the first and second transducers comprises an actuator for moving the slider.

17. The data storage apparatus of claim 15, wherein the device for alternatively directing the electromagnetic radiation to the first and second transducers comprises:

a mirror for reflecting the electromagnetic radiation onto the first and second transducers; and an actuator for moving the mirror.

18. The data storage apparatus of claim 15, wherein the device for alternatively directing the electromagnetic radiation to the first and second transducers comprises:

an optical fiber for directing the electromagnetic radiation onto the first and second transducers; and an actuator for moving the optical fiber.

19. The data storage apparatus of claim 15, wherein the device for alternatively directing the electromagnetic radiation to the first and second transducers comprises:

a polarization control device.

20. The data storage apparatus of claim 11, wherein each of the first and second transducers includes a near field transducer comprising one of: a metallic pin, a bow tie optical antenna, an aperture, or a ridge waveguide.

* * * * *